Oct. 20, 1942.　　　　L. I. YEOMANS　　　　2,299,119
BEARING
Filed Sept. 9, 1939　　　2 Sheets-Sheet 1
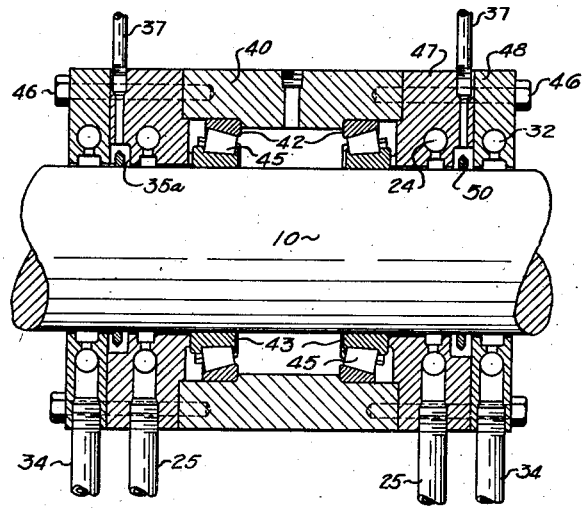
Fig. 4
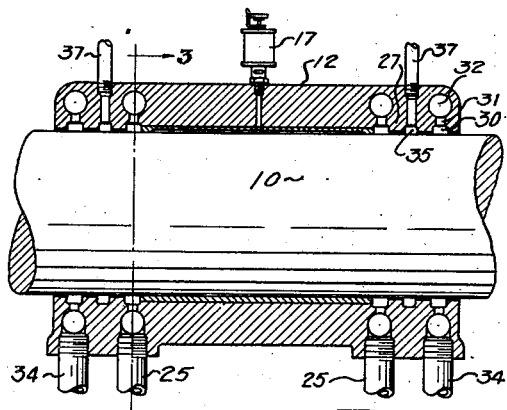
Fig. 2
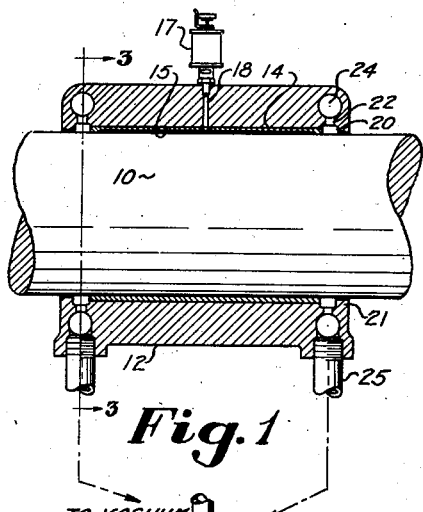
Fig. 1
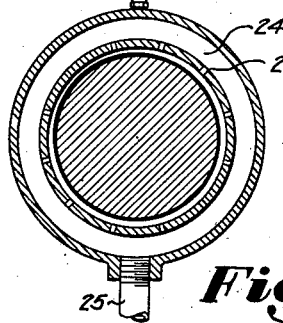
Fig. 3
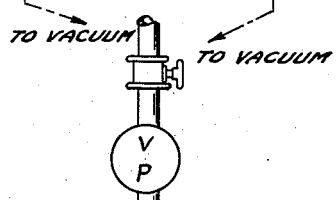
INVENTOR.
LUCIEN I. YEOMANS
BY
ATTORNEY.

Oct. 20, 1942.   L. I. YEOMANS   2,299,119
BEARING
Filed Sept. 9, 1939   2 Sheets-Sheet 2

INVENTOR.
LUCIEN I. YEOMANS
BY
ATTORNEY.

Patented Oct. 20, 1942

2,299,119

UNITED STATES PATENT OFFICE 2,299,119

BEARING

Lucien I. Yeomans, Chicago, Ill., assignor to E. W. Bliss Company, Brooklyn, N. Y., a corporation of Delaware Application September 9, 1939, Serial No. 294,156

3 Claims. (Cl. 308—36.3)

This invention relates to bearings and particularly to fluid lubricated bearings in which heavy loads are handled; and is particularly directed to improving the lubrication efficiency of the bearing and to prevent the ingress of foreign matter between the surfaces.

Bearings of the general nature outlined above are old but have never been built to control with complete satisfaction the lubrication film between the surfaces and keep dirt and impurities from the contacting bearing surfaces with any high degree of certainty. This has been especially true with bearings intended for use under heavy total pressures in large installations such as the bearings for rock crushers, roll necks of rolling mills, turbines and the like. The same disadvantages hold true with other and smaller bearings and with ball or roller bearings of any size.

Generally speaking, my invention employs a fluid stream, preferably air under partial vacuum, to suck the lubricating medium through a desired path and to similarly suck any impurities away from the bearing surfaces. I am aware that it has been proposed to provide a combination of retainer elements as rawhide, leather or the like past which air or other fluid is allowed to leak and thereby to some extent prevent the mixture of foreign matter from outside the housing with lubricant within the housing by setting up a flow opposite the path such foreign matter seeks to take. Such a construction is shown in the patent to Hurtt issued August 2, 1938, bearing the number 2,125,446.

This patented construction is, however, totally different from my present invention. In the first place, a slight air leakage is set up past ordinary packing members and one object of my invention has been to eliminate any necessity for such members which must be frequently replaced at considerable inconvenience. Furthermore, in the patent above referred to, the air pressure is established in such a direction that it raises the air pressure at the edge of the bearing surface by a fluid flow tending to go into the bearing proper. Any trend in this direction is harmful because it builds up a pressure cushion against which the lubricating medium must be forced with a consequent liability to make the oil film spotty and break its continuity. If the construction of the patent functions as set out in the specification it requires a higher input pressure of the lubricant than is normally needed. This is because air is blown opposite to any line of lubricant travel through the bearing and sets up a resistance dependent on the flow of air. In short the patent under discussion works on the principle of directing a fluid pressure contrary to the desired line of flow, if any, of the lubricant in the bearing and in a direction to push foreign matter away from the edges of the bearing surfaces.

My present invention is far more efficient and functions in the opposite manner by employing a partial fluid vacuum to suck the excess lubricating medium from between the bearing surfaces and carry it to an oil cleaner. It also functions to suck any impurities, grit, water or the like away from the bearing surface. This is of marked advantage in handling the lubricant because there is a continuous flow in the same direction from the point at which lubricant is admitted to the bearing until it is withdrawn from the edges thereof at a partial vacuum. Furthermore, there is a considerable pressure drop between the point of admittance of lubricant and the point of its removal acting to increase the lubricant flow and provide a continuous film over the surface of the bearing which film is under movement and is being continually changed by its passage through the system. Also by sucking away any impurities adjacent the bearing, an increased efficiency of removal is obtained because by flow induced through vacuum such impurities may be sucked through a relatively small passage at a high velocity as contrasted with the leakage of air to atmosphere as set out in the Hurtt patent above identified.

Such a construction positively prevents any admixture of water and oil in the oil recovery system, with consequent avoidance of emulsification. Air at any pressure flowing into a perfect vacuum is at its highest possible velocity and, while a perfect vacuum is not a possibility, the velocity secured in these sealing films is sufficient to make possible perfect separation of oil and water.

The general object of my invention therefore has been to provide effective fluid seals for journal bearings which will prevent the escape of lubricant along the journal and will reclaim for re-use lubricant withdrawn from the ends of the bearing. Another object of the invention has been to facilitate the cooling of bearings where a large quantity of lubricant is circulated for such purposes. Still another object has been to exclude foreign liquids and solids from the bearing housing at the ends thereof and to effectually separate such foreign matter from the lubricant and to separately withdraw each from the bearings. A further object of the invention has been to create such seals without the use of yieldable or other shaped sealing elements which are in substantial contact with the moving surfaces.

My present invention is particularly well adapted for use in roller mill bearings as such a construction prevents any impurities such as scale on the material being rolled or water sprayed thereon from entering into the bearing surface proper.

To the accomplishment of the foregoing and related ends, said invention then, consists of the method and elements hereinafter fully described and particularly pointed out in the claims; the annexed drawings and the following description setting forth in detail certain structure embodying the invention, such disclosed elements consisting, however, but one of various forms in which the principle of the invention may be used.

In said annexed drawings:

Fig. 1 is a longitudinal view, partly in section, of a bearing designed to prevent the escape of lubricant from the housing along the journal;

Fig. 2 is a similar view for conditions wherein it is desired to also exclude foreign matter from the bearing surfaces;

Fig. 3 is a section through either Figs. 1 or 2 as indicated by the lines 3—3 on each;

Fig. 4 is a longitudinal view, partly in section, of a roller bearing construction embodying my invention;

Figure 5:
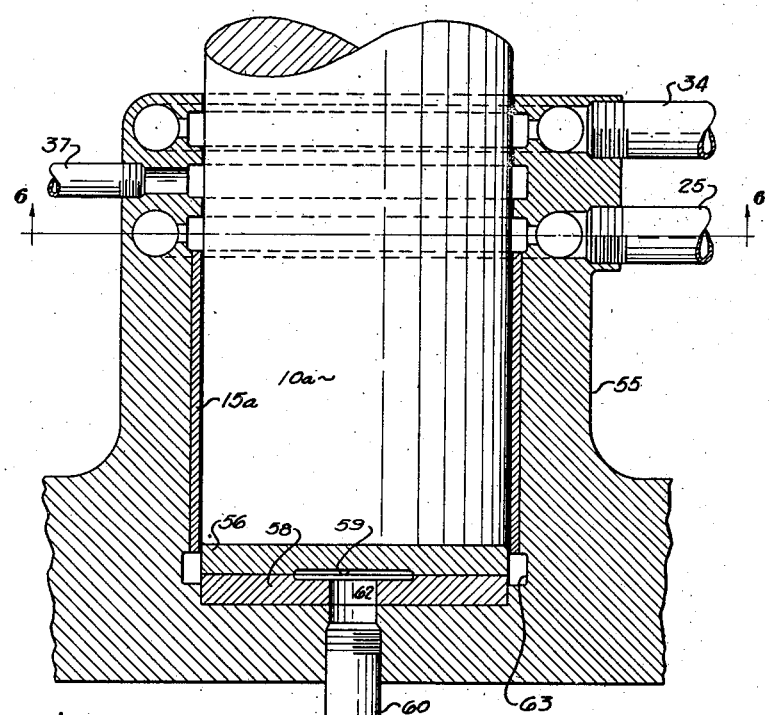
Fig. 5 is a view, partly in section, of a vertical thrust bearing embodying the present invention.

Referring now to Fig. 1, 10 is a journal, as a mill roll neck or the like, rotatably mounted in a bearing housing 12. A liner 14 of suitable bearing metal is fixedly carried by the housing and is provided with a polished surface to receive the outer polished surface of the journal 10, suitable bearing clearance being provided by the parts. A lubricant distribution groove 15 is formed in the lining in any desired configuration and is supplied by lubricant in any suitable manner as from a conventional oiler 17 threadingly carried by the housing 12. A passage 18 leads from the oiler to discharge into the groove 15.

Lubricant removal passages are provided at each end of the liner 14 although it will be apparent that in some constructions the relative positions of the same with respect to the liners may be varied and in certain instances only one end of the liner may be provided with such a passage. These passages as hereinafter described are maintained under partial vacuum and by communicating with ends of the bearing surfaces tend to suck lubricant therefrom and remove it without loss.

Such passages, indicated at 20, extend annularly within the bearing housing 12 adjacent the ends of the bearing liner to form continuous passages bounding the entire edge of each end of the bearing. On the exterior portion these passages are bounded by a wall section 21 of the housing, such section being spaced from the journals a sufficient distance so that under all circumstances there is no contact between the inner annular face of the walls and the journal. Thus at all times there will be thin passages open between the journal and the section 21 to provide for ingress of air from outside the bearing housing into the passages 20. This bearing is intended for use under conditions where the ambient atmosphere is clean and the bearing need not be guarded against dirt.

The passages each communicate through a series of radial ports 22 with an exhaust conduit 24 which in turn is connected by pipe 25 to an exhaust system, such as a vacuum pump diagrammatically shown in Fig. 1.

This exhaust system which may be of any conventional type is provided to maintain a partial vacuum at all times with the passages 20 and the conduits 24, which means that there is always a sucking action exerted at the edge of the bearing adjacent such passages. An oil filter or cleaner is included in the system to purify the oil received.

Where foreign material must be effectively removed from the bearing vicinity, a construction as shown in Fig. 2 is employed. Here the passages 20, conduits 24 and related passages are provided to handle the lubricant as already described in connection with Fig. 1. Similarly a housing section 27 is provided which is similar with the housing section 21 in so far as clearance between it and the journal 10 is concerned.

In addition to the passages already described, I have provided in the construction of Fig. 2 a second set of conduits consisting of an annular passage 30 identical in formation with passage 22 which in like manner communicates through openings 31 with a conduit 32 discharging through pipe 34 to an exhaust system. The passages 20, as already set out, are provided to handle lubricant exuding from the bearing surfaces. The passages 30 connecting with the pipe 34, on the other hand, and which are also maintained under a partial vacuum, remove waste particles, water and other impurities.

In order to supply a sufficient amount of air to maintain an air stream through the oil removing system and the impurities removing system an annular air supply duct or passage 35 is provided located between the passages 20 and 30. This center passage is separated from passages 20 and 30 by extensions of the housing which extend toward the journal but are spaced therefrom with sufficient clearance to allow air to pass from one passage to the other. Thus air supplied to the passage 35 from piping 37 is immediately sucked in two directions into the passages 20 and 30 and thereby serves the dual purpose of supplying the necessary flow of fluid to separately remove the lubricant and any impurities. It also provides a barrier to prevent mingling of the lubricant and impurities.

Roller bearings, ball bearings and the like may be employed with my invention instead of the liners 15 already described and such a construction is shown in Fig. 4. Here the housing comprises a circular ring 40 provided with an inner finished surface to receive the outer races 42 of a pair of tapered roller bearings. The inner races 43 are carried by the journal 10 and, of course, are spaced from the outer races by the rolls 45. Bolted to each end of the ring 40, as by bolts 46, are two cooperating rings 47 and 48. The two pairs of end rings and the central ring cooperate to form a complete housing.

The rings 48 carry the impurity removal passages terminating in the connection 34. The rings 47 on the other hand carry the oil removing passages terminating in the pipe 25 and also carry the air supply system including the pipe 37.

It will be apparent that the construction just described may be employed in existing bearings which may be modified to embody the present invention. As will hereafter become apparent from the following modification of my invention practically any kind of existing bearing can be rebuilt to embody the present invention.

A modification of the air supply system is shown in Fig. 4 in which an enlarged air supply passage 35A accommodates a deflector 50 mounted for rotation with the journal 10 in any suitable manner. This aids in directing and controlling the fluid flow between the supply passage and the two exhaust passages.

Figure 6:
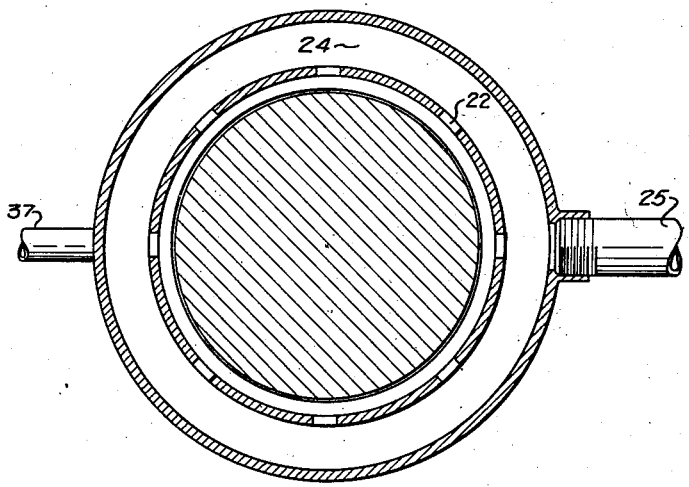
Fig. 6 is a section through Fig. 5 as indicated by the line 6—6 thereon.

A thrust bearing employing the principles of my invention is shown in Figs. 5 and 6 wherein the bearing is received in a housing 55. As there shown a thrust plate 56 supports a vertical journal 10A and bears against a thrust plate 58 received in the bottom of the housing 55. The two thrust plates rotate with respect to each other and the mating surfaces are recesses at 59 to receive lubricant from a supply line 60 discharging through the lower thrust plate at 62.

The lubricant is supplied under sufficient pressure to force its way between the thrust plates, finally passing into an annular passage 63, and thence finding its way upwardly between the cylindrical portion and a cooperating liner 15A to be removed by vacuum through the passage system terminating in a discharge pipe 25 as heretofore described. It will be seen that this modification includes an air supply system from a pipe 37 and a waste material exhaust system terminating in pipe 34 similar to that above described.

Certain of the elements of the present invention may be employed in different combinations and may for instance embody only an oil removal system or only an impurity removal system or both, as desired. Similarly, the roller bearings such as shown in Fig. 4 may be substituted in the thrust bearing of Fig. 5 if desired. Also if the journal surface is stepped or tapered, modifications to conform to such surface are within the scope of my invention and are contemplated by me.

In certain of the claims I have generally designated the extraneous substances removed from the bearing vicinity as foreign matter. This broadly includes lubricant and dirt particles, water and the like. In certain other claims where I refer to both foreign matter and lubricant; by foreign matter I mean all impurities and by lubricant I means the actual bearing lubricating medium.

From the foregoing description it will be seen that I have provided an improved bearing adapted to a multitude of uses and which may be built in varying sizes from very small bearings up to the largest type of bearings such as those in rolling mills and the like.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a plain sliding oil film bearing, a housing structure adapted to receive a rotatable member, a member rotatably carried therein to provide a plain sliding oil film bearing surface therewith, means to supply lubricant between said structure and said member to thereby lubricate said bearing, a pair of spaced annular passages formed in one end of said bearing structure and connected by an opening formed by the clearance afforded between relatively rotatable parts of said bearing, conduits connecting with said passages, means to provide a partial vacuum through said passages and conduits respectively by maintaining a fluid stream into one passage and out of the other to establish a fluid flow to remove lubricant or other foreign matter adjacent said bearing away from said member.

2. In a plain sliding oil film bearing, a housing structure adapted to receive a rotating member, a member rotatably carried therein, a bearing liner carried by said housing and interposed between said housing and said member to provide a plain sliding oil film bearing surface therewith, means to supply lubricant to said liner to thereby lubricate said bearing, a pair of spaced annular passages at each end of said bearing structure beyond said bearing surface, conduits connecting with said passages, means to provide a partial vacuum through said passages and conduits respectively by establishing a closed fluid stream into one of each pair of passages and out of the other of each pair to create a fluid flow to remove lubricant or other foreign matter adjacent said bearing away from said member.

3. In a plain sliding oil film bearing, a housing structure adapted to receive a rotatable member, a member rotatably carried therein, a bearing liner carried by said housing and interposed between said housing and said member to provide a plain sliding oil film bearing surface therewith, means to supply lubricant to said liner to thereby lubricate said bearing, a pair of spaced annular passages at one end of said liner, conduits connecting with said passages, means to provide a partial vacuum through said passages and conduits respectively to establish a fluid flow to remove lubricant and other foreign matter adjacent said bearing away from said shaft and means to prevent intermingling of said lubricant and said other foreign matter as it is withdrawn.

LUCIEN I. YEOMANS.